Sept. 24, 1957  J. GILBERT ET AL  2,807,301
DETACHABLE FOOD CARRIAGE FOR SLICING MACHINES
Filed Sept. 9, 1955
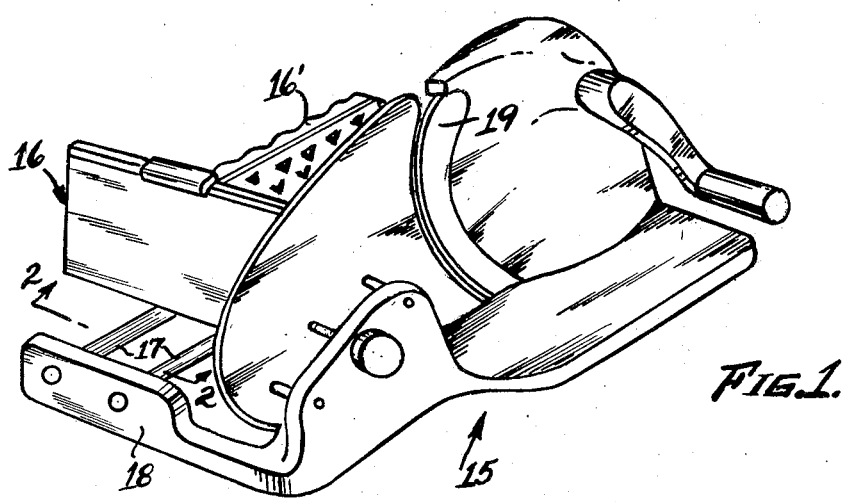
FIG.1.
FIG.3.
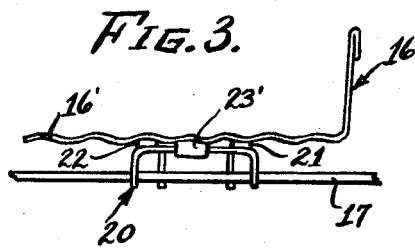
FIG.2.
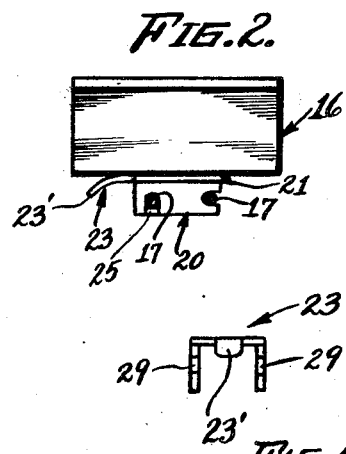
FIG.5.
FIG.4.
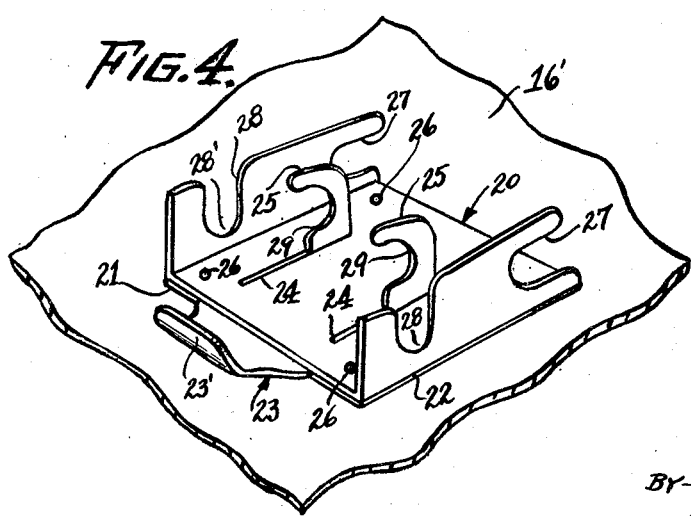
INVENTORS
JACK GILBERT,
HARRY PREBLE, JR.,
BY 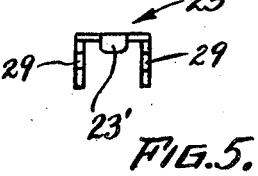
ATTORNEY

2,807,301
DETACHABLE FOOD CARRIAGE FOR SLICING MACHINES

Jack Gilbert, Newburgh, and Harry Preble, Jr., Cross River, N. Y., assignors to General Slicing Machine Co., Inc., Walden, N. Y., a corporation of New York Application September 9, 1955, Serial No. 533,418

2 Claims. (Cl. 146—102)

The present invention relates for instance to a food slicing machine of the type having a food carriage slidably mounted on track means on which it is moved to and fro past a cutting blade.

The principal object of this invention is to provide a novel and improved construction for say a food slicing machine of the character described, which affords easy removal of the carriage so that it could be cleaned and then easily remounted for use.

Another object hereof is to provide a slicing machine of the character indicated, embodying an easily detachable and remountable food carriage which employs a latch means serving as the bearing which extends from the carriage and is slidably mounted on the track.

A further object hereof is to provide a slicing machine of the type set forth, having novel and improved bearing means on its slidable carriage, which locks the carriage onto its track and is easily manipulated to unlock so that the carriage is removable from its track.

Another object of this invention is to provide novel and improved apparatus of the nature set forth, which is reasonably cheap to manufacture, easy and convenient to use and efficient in carrying out the purposes for which it is designed.

Other objects and advantages will become apparent as this disclosure proceeds.

In the accompanying drawings forming part of this specification, similar characters of reference indicate corresponding parts in all the views.

Fig. 1 is a perspective view of a food slicing machine embodying the teachings of this invention.

Fig. 2 is a section taken at lines 2—2 in Fig. 1.

Fig. 3 is a left side view of Fig. 2.

Fig. 4 is an enlarged fragmentary perspective view of the underside of the food carriage and the structure it carries serving as its bearing and latch.

Fig. 5 shows the slide component of said latch means as it appears in Fig. 3.

In the drawings, the numeral 15 designates generally a food slicing machine of the type having a food carriage 16 which is slidable to and fro along the track rods 17 which are mounted on the frame 18. This carriage with a food mass thereon to be sliced, is slid past the rotatable disc blade 19. These machines are well known in the art.

Of importance herein is the provision affording easy removal and remounting of the carriage 16. This of course permits easy cleaning of the carriage, its track rods and the back of the machine generally. In essence, all slide bearings are of the split-type and a part serving as a latch is also part of such bearing means.

In the embodiment illustrated, the underside of the carriage food platform 16', carries depending therefrom, an inverted channel 20, which is up against and below a pair of spaced strips 21, 22, offering a track for the slide latch member denoted generally by the numeral 23. The floor of the channel has two spaced lengthwise slots 24. The slide 23 has a pair of spaced downward lugs or tabs 25 which extend through said slots 24 respectively into the channel 20. It is to be noted that the said channel is lengthwise across the track rods 17 and the handle 23' of the latch 23, is at the left in Fig. 1 so that it is accessible for manipulation. The numeral 26 denotes rivets to maintain the assembly. Of course, welding may be used instead.

Each end of the side walls of the channel member 20, which is nearest the plane of the blade 19, is provided with a lengthwise notch 27 and spaced from said notches. Each of said side walls has an upward notch 28. These four notches in the embodiment illustrated, serve as open bearings for the carriage 16 on the track rods respectively; the notches 27 receiving one of said rods, and the notches 28, the other of said rods 17. The tabs 25, each has a notch 29, which are opposite in direction with respect to the notches 27. In the machine shown, the notches 27, 29 are horizontal, while notches 28 are vertical and the base of each is a semi-circle as at 28' so that each straddles and contacts half around each of the rods respectively since all the centers of said half circles are coplanar. When the carriage is unlatched, the tabs 25 lie between the notches 27, 28. When the carriage 16 is latched by pulling the slide latch 23 away from the blade plane, the aggregate contact with the rod 17 in the notches 28, 29 is a full circle in each pair of such notches, or at least more than a half circle, hence the carriage 16 is held secure against removal from off the track rods 17, but free to be slid therealong for operation of the machine.

It is evident that pulling on the slide handle 23', will free the carriage 16 for removal from off the rods 17. To remount same, the carriage is held tilted to clear the rod 17 which is farthest from the blade 19, while the carriage is set that the notches 27 receive the rod 17 which is nearest to the blade plane. Then the carriage is lowered so that the rod which is farthest from blade plane, is received in the notches 27. Then the slide 23 is slid away from the blade plane until the notches 29 fully contact the last mentioned track rod.

This invention is capable of numerous forms and various applications without departing from the essential features herein disclosed. It is therefore intended and desired that the embodiment herein shall be deemed illustrative and not restrictive and that the patent shall cover all patentable novelty herein set forth; reference being had to the following claims rather than to the specific description herein to indicate the scope of this invention.

We claim:

1. In a food slicing machine, a frame, a track bar mounted on the frame, a carriage having an open bearing mounted thereon; said bearing being on said bar, straddling same and slidable therealong and also removable from said bar by being moved laterally thereof and a latch member carried on the carriage and so positioned thereon that it contacts said bar and is slidable therealong upon movement of the carriage along the bar; that part of the latch which contacts the bar, being another open bearing straddling said bar; said latch holding the carriage against movement laterally of said bar; said latch being movable away from said bar whereupon it is free of said bar and the carriage is removable from said bar by a movement thereof laterally of said bar.

2. The machine as defined in claim 1, wherein the open bearings straddle the bar in different directions which are in angular relation.

References Cited in the file of this patent

UNITED STATES PATENTS

| | | |
|---|---|---|
| 1,849,305 | Magarian | Mar. 15, 1932 |
| 2,323,153 | Pilson | June 29, 1943 |
| 2,433,978 | Bergeron | Jan. 6, 1948 |
| 2,748,907 | Green et al. | June 5, 1956 |